United States Patent
Colbeau-Justin et al.

(10) Patent No.: US 12,077,444 B2
(45) Date of Patent: Sep. 3, 2024

(54) PRECIPITATED SILICA WITH IMPROVED PROCESSING PROPERTIES

(71) Applicant: RHODIA OPERATIONS, Aubervilliers (FR)

(72) Inventors: Frédéric Colbeau-Justin, Collonges au Mont d'Or (FR); Cédric Boivin, Chasselay (FR); Cyril Chomette, Mérignac (FR); Thomas Chaussee, Cailloux-sur-Fontaines (FR); Laurent Guy, Sathonay-Camp (FR)

(73) Assignee: RHODIA OPERATIONS, Aubervilliers (FR)

( * ) Notice: Subject to any disclaimer, the term of this patent is extended or adjusted under 35 U.S.C. 154(b) by 918 days.

(21) Appl. No.: 17/253,197

(22) PCT Filed: Jul. 12, 2019

(86) PCT No.: PCT/EP2019/068836
§ 371 (c)(1),
(2) Date: Dec. 17, 2020

(87) PCT Pub. No.: WO2020/011984
PCT Pub. Date: Jan. 16, 2020

(65) Prior Publication Data
US 2021/0114889 A1    Apr. 22, 2021

(30) Foreign Application Priority Data

Jul. 13, 2018 (EP) .................................. 18305945
Nov. 29, 2018 (EP) .................................. 18209037

(51) Int. Cl.
| | |
|---|---|
| C08K 3/36 | (2006.01) |
| C01B 33/193 | (2006.01) |
| C08L 9/06 | (2006.01) |
| C08L 23/22 | (2006.01) |
| B60C 1/00 | (2006.01) |

(52) U.S. Cl.
CPC ............ C01B 33/193 (2013.01); C08L 9/06 (2013.01); C08L 23/22 (2013.01); B60C 1/0016 (2013.01); B60C 2200/04 (2013.01); C01P 2004/51 (2013.01); C01P 2006/12 (2013.01); C08K 3/36 (2013.01)

(58) Field of Classification Search
None
See application file for complete search history.

(56) References Cited

U.S. PATENT DOCUMENTS

| | | | |
|---|---|---|---|
| 9,902,620 B2 | 2/2018 | Fournier et al. | |
| 2005/0032965 A1* | 2/2005 | Valero | C08K 3/36 |
| | | | 524/493 |
| 2005/0267242 A1 | 12/2005 | Custodero et al. | |
| 2005/0282951 A1 | 12/2005 | Esch et al. | |
| 2011/0263784 A1 | 10/2011 | Valero et al. | |

FOREIGN PATENT DOCUMENTS

| | | | |
|---|---|---|---|
| EP | 0280623 | * | 8/1988 |
| EP | 0647591 A1 | | 4/1995 |
| EP | 0735088 | * | 10/1996 |
| EP | 2325141 A1 | | 5/2011 |
| EP | 2102104 B1 | | 9/2017 |
| WO | 9928376 A | | 6/1996 |
| WO | 03016215 A1 | | 2/2003 |
| WO | 2009112458 | * | 9/2009 |
| WO | 2017109742 | * | 6/2017 |

OTHER PUBLICATIONS

ASTM D5992-96 "Standard Guide for Dynamic Testing of Vulcanized Rubber and Rubber-Like Materials Using Vibratory Methods" (1996 version—reappouved in 2018) (25 pg.).
ASTM D 2240 "Standard Test Method for Rubber Property-Durometer Hardness" (2015 version) (13 pg.).
Standard NF ISO 5794-1, "Rubber compounding ingredients—Silica, precipitated, hydrated—Part 1: Non-rubber tests" Mar. 15, 2010 (36 pg.).
Standard ISO 787/9:2019€, "General methods of test for pigments and extenders—Part 9: Determination of pH value of an aqueous suspension" Mar. 2019 (8 pg.).
NF ISO 289 standard, "Rubber, unvulcanized—Determinations using a shearingdisc viscometer—Part 1: Determination of Mooney viscosity" Sep. 1, 2015 (5 pg.).
NF ISO 289 standard, "Rubber, unvulcanized—Determinations using a shearingdisc viscometer—Part 2: Determination of pre-vulcanization characteristics" Apr. 2020 (5 pg.).
NF ISO 289 standard, "Rubber, unvulcanized—Determinations using a shearingdisc viscometer—Part 3: Determination of the Delta Mooney value for non-pigmented, oil-extended emulsion-polymerized SBR." Oct. 15, 2015 (6 pg.).
NF ISO 3417 standard "Rubber—Measurement of vulcanization characteristics with the oscillating disc curemeter", Dec. 1, 2008 (16 pg.).
NF ISO 37 standard, "Rubber, vulcanized or thermoplastic—Determination of tensile stress-strain properties" Nov. 2017 (8 pg.).

* cited by examiner

*Primary Examiner* — Sheng H Davis
(74) *Attorney, Agent, or Firm* — Osha Bergman Watanabe & Burton LLP

(57) ABSTRACT

A precipitated silica for use in tire applications. In particular, a precipitated silica characterised by a CTAB surface area $S_{CTAB}$ greater than 140 m²/g; a width of the aggregate size distribution Ld, measured by centrifugal sedimentation, of at least 1.2; a pH of less than 5.5; and a carbon content of less than 1500 ppm.

19 Claims, No Drawings

PRECIPITATED SILICA WITH IMPROVED PROCESSING PROPERTIES

CROSS-REFERENCE TO RELATED APPLICATIONS

This application is a U.S. national stage entry under 35 U.S.C. § 371 of International Application No. PCT/EP2019/068836 filed Jul. 12, 2019, which claims priority to European patent application No. 18305945.0, filed on Jul. 13, 2018 and to European patent application EP 18209037.3, filed on Nov. 29, 2018, the whole content of each of these applications being incorporated herein by reference for all purposes.

TECHNICAL FIELD

The present invention relates to precipitated silica having improved ability to disperse in elastomeric compositions.

BACKGROUND ART

The use of precipitated silica as a reinforcing filler in polymeric compositions, in particular in elastomeric compositions, is known. Such use is highly demanding: the filler has to readily and efficiently incorporate and disperse in the elastomeric matrix and, typically in conjunction with a coupling reagent, enter into a chemical bond with the elastomer(s), to lead to a high and homogeneous reinforcement of the elastomeric composition. Silica-filled elastomeric compositions find a particularly advantageous use in tire formulations. Tire treads filled with so-called highly dispersible silicas have made it possible to achieve a compromise of properties, in terms of rolling resistance, wear resistance and grip, which cannot be obtained with a conventional carbon black for tires.

Precipitated silica having high surface area is known. For instance WO 03/016215 A1 discloses precipitated silica having a high surface areas and broad particle size distribution.

When compared to a precipitated silica having the same surface area, a silica with a broader particle size distribution allows to obtain elastomeric compositions having reduced energy dissipation properties (hence reduced heat build-up) and a good level of reinforcement.

The advantage of using a high surface area silica resides mainly in the possibility of increasing the number of bonds of the silica with the elastomer and therefore of increasing the level of reinforcement thereof. Therefore, it appears advantageous to use, in tire tread rubber compositions, silica having a high surface area, which may be greater than the one which is conventionally used, in particular for improving the wear resistance of the tire.

However it has been observed that the ability of the charge to disperse in the elastomeric matrix and the increase of its surface area are antinomic characteristics. Indeed, a large surface area supposes an increase in the interactions between charge objects, and therefore a poor dispersion in the elastomeric matrix and a poor mixing.

There is therefore always a need for novel precipitated silica for use as reinforcing filler in polymeric compositions which provides for an optimal balance among all of the above-mentioned requirements.

SUMMARY OF INVENTION

It has surprisingly been found that the ability of precipitated silicas having high surface area and large aggregate size distribution to disperse in an elastomeric matrix may be improved if the pH of the silica is acidic. In particular it has been found that precipitated silicas having high surface area, large aggregate size distribution and a pH of less than 5.5 are easier to disperse in elastomeric matrices.

Accordingly a first object of the present invention is a precipitated silica characterised by:
- a CTAB surface area $S_{CTAB}$ greater than 140 m$^2$/g;
- a width of the aggregate size distribution Ld, measured by centrifugal sedimentation, of at least 1.2;
- a pH of less than 5.5; and
- a carbon content of less than 1500 ppm.

In the remainder of the text the terms "silica" and "precipitated silica" may be used interchangeably to refer to precipitated silica.

The CTAB surface area $S_{CTAB}$ is a measure of the external specific surface area as determined by measuring the quantity of N hexadecyl-N,N,N-trimethylammonium bromide adsorbed on the silica surface at a given pH.

The CTAB surface area $S_{CTAB}$ is greater than 150 m$^2$/g, preferably greater than 160 m$^2$/g. The CTAB surface area $S_{CTAB}$ is typically greater than 170 m$^2$/g, preferably greater than 180 m$^2$/g. The CTAB surface area $S_{CTAB}$ may even be equal to or greater than 190 m$^2$/g, even greater than 200 m$^2$/g, still even greater than 230 m$^2$/g.

The CTAB surface area $S_{CTAB}$ does not exceed 400 m$^2$/g, typically 380 m$^2$/g. The CTAB surface area $S_{CTAB}$ may be lower than 350 m$^2$/g.

For elastomer reinforcement applications advantageous ranges of CTAB surface area $S_{CTAB}$ are: from 160 to 400 m$^2$/g, from 170 to 400 m$^2$/g, from 180 to 350 m$^2$/g, preferably from 190 to 350 m$^2$/g, from 200 to 350 m$^2$/g, even from 220 to 350 m$^2$/g, preferably from 180 to 300 m$^2$/g, and still from 190 to 300 m$^2$/g.

The precipitated silica of the invention is further characterised by a broad aggregate size distribution. The term "aggregate" is used herein to refer to aggregates of primary silica particles. Aggregates are the smallest assembly of primary silica particles that can be broken by mechanical action.

Parameter Ld, defined as Ld=(d84−d16)/d50, determined by means of centrifugal sedimentation in a disc centrifuge as detailed hereafter, is used to characterize the width of the aggregate size distribution. Ld is defined as follows:

$$Ld=(d84-d16)/d50$$

wherein dn is the diameter below which n % of the total measured mass is found. Ld is an adimensional number. The width of the aggregate size distribution Ld is calculated on the cumulative aggregate size curve. As an example, d50 represents the diameter below (and above) which 50% of the total mass of aggregates is found. Thus, d50 represents the median aggregate size of a given distribution, wherein the term "size" in this context has to be intended as "diameter".

The width of the particle size distribution Ld is at least 1.2, typically at least 1.3. The width of the particle size distribution Ld is no more than 4.0, typically no more than 3.5.

Advantageously, the width of the particle size distribution Ld of the inventive silica is in the range from 1.2 to 3.5, even in the range from 1.3 to 3.2. The width of the particle size distribution Ld of the inventive silica can be in the range from 1.2 to 3.0, preferably from 1.3 to 2.5.

The inventive silica does not contain any organic moiety covalently attached to its surface. Preferably the inventive silica does not contain any organic moiety adsorbed or covalently attached to its surface.

The inventive silica has a carbon content which is less than 1500 ppm, even less than 1400 ppm. Preferably, the inventive silica has a carbon content which does not exceed 1000 ppm. More preferably the carbon content of the inventive silica is less than 500 ppm, more preferably less than 100 ppm. The carbon content in the inventive silica may even be less than 10 ppm.

The pH of the inventive silica is less than 5.5, preferably less than 5.2, more preferably less than 5.0, and even less than 4.5. The pH typically is not less than 2.5, preferably not less than 3.0, generally not less than 3.5.

It has been found that precipitated silica having a pH of less than 5.5, when compared to a similar precipitated silica having a higher pH is easier to disperse in an elastomeric matrix.

In particular, it has been found that the inventive precipitated silica is characterized by a high intrinsic ability to disperse in elastomeric compositions. This ability may be illustrated by the disagglomeration rate α (measured according to the disagglomeration test as described hereafter). It has been found that the disagglomeration rate α of the silica of the invention is typically at least 15% higher than the disagglomeration rate α of a precipitated silica having the same surface area and width of the aggregate size distribution but a higher pH.

The inventive silica generally has a disagglomeration rate α equal to or greater than $0.5 \times 10^{-2}$ $\mu m^{-1} min^{-1}$. The disagglomeration rate α may be equal to or greater than $0.6 \times 10^{-2}$ $\mu m^{-1} min^{-1}$.

In a first advantageous embodiment, the inventive silica is characterized by:
- a CTAB surface area $S_{CTAB}$ greater than 140 $m^2/g$, preferably greater than 160 $m^2/g$;
- a width of the aggregate size distribution Ld, measured by centrifugal sedimentation, of at least 1.2;
- a pH of less than 5.5;
- a carbon content of less than 1500 ppm; and
- a disagglomeration rate α equal to or greater than $0.5 \times 10^{-2}$ $\mu m^{-1} min^{-1}$.

In a further advantageous embodiment the inventive silica is characterized by:
- a CTAB surface area $S_{CTAB}$ greater than 160 $m^2/g$;
- a width of the aggregate size distribution Ld, measured by centrifugal sedimentation, of at least 1.2;
- a pH of less than 5.5;
- a carbon content not exceeding 1000 ppm; and
- a disagglomeration rate α equal to or greater than $0.5 \times 10^{-2}$ $\mu m^{-1} min^{-1}$.

The inventive precipitated silica is typically characterized by a large pore volume distribution as defined in terms of the ratio $V_{(d5-d50)}/V_{(d5-d100)}$, wherein $V_{(d5-d50)}$ represents the pore volume formed by the pores of diameters between d5 and d50 and $V_{(d5-d100)}$ represents the pore volume formed by the pores of diameters between d5 and d100, dn here being the pore diameter for which n % of the total surface area of all the pores is formed by the pores of diameter greater than that diameter.

The inventive silica typically has a ratio $V_{(d5-d50)}/V_{(d5-d100)}$ equal to or greater than 0.60, preferably equal to or greater than 0.65. The ratio $V_{(d5-d50)}/V_{(d5-d100)}$ typically does not exceed 1.20.

The precipitated silica according to the invention has a BET surface $S_{BET}$ of at least 150 $m^2/$, of at least 165 $m^2/g$, in particular of at least 170 $m^2/g$ and preferably of at least 190 $m^2/g$. The BET surface may be even of at least 200 $m^2/g$. The BET surface generally is at most 450 $m^2/g$, in particular at most 420 $m^2/g$, and even at most 400 $m^2/g$.

The inventive silica is characterised by a number of silanols SiOH per $nm^2$, $N_{SiOH/nm2}$, greater than 3.5. The number of silanols SiOH per $nm^2$ is typically between 3.5 and 6.0, preferably between 3.5 and 5.5.

The inventive silica may contain additional cations. Notable, non-limiting example of a suitable cations are for instance Al, Mg, Ca or Zn.

In one embodiment of the invention the precipitated silica contains more than 1500 ppm of aluminium, typically more than 2000 ppm. The amount of aluminium is defined as the amount by weight of aluminium metal with respect to the weight of silica. The amount of aluminium typically does not exceed 10000 ppm.

In a second embodiment, the inventive silica contains no or low traces of other cations, e.g. aluminium which typically are contained in the silicate starting material the precipitated silica. Among said additional elements mention may be made of aluminium. In this second embodiment, the content of aluminium in the inventive silica generally does not exceed 1400 ppm, preferably it does not exceed 1000 ppm and more preferably it does not exceed 500 ppm.

A second object of the present invention is a process for preparing the precipitated silica of the first object, said process comprising:
(i) providing a starting solution having a pH from 2.0 to 5.0,
(ii) simultaneously adding a silicate and an acid to said starting solution such that the pH of the reaction medium is maintained in the range from 2.0 to 5.0,
(iii) stopping the addition of the acid and of the silicate and adding a base to the reaction medium to raise the pH of said reaction medium to a value from 7.0 to 10.0,
(iv) simultaneously adding to the reaction medium a silicate and an acid, such that the pH of the reaction medium is maintained in the range from 7.0 to 10.0,
(v) stopping the addition of the silicate while continuing the addition of the acid to the reaction medium to reach a pH of the reaction medium of less than 5.5 and obtaining a suspension of precipitated silica, and
(vi) submitting said suspension of precipitated silica to filtration to provide a filter cake;
(vii) submitting said filter cake to a liquefaction step in the presence of a mineral acid such that the pH of the resulting precipitated silica is less than 5.5, to obtain a suspension of precipitated silica; and
(viii) optionally, drying the precipitated silica obtained after the liquefaction step.

The term "base" is used herein to refer to one or more than one base which can be added during the course of the inventive process and it includes the group consisting of silicates as defined hereafter. Any base may be used in the process. Notable non-limiting examples of suitable bases are for instance silicates, alkali metal hydroxides and ammonia. The base is preferably selected from alkali metal hydroxides, typically sodium or potassium hydroxide, or ammonia.

The term "silicate" is used herein to refer to one or more than one silicate which can be added during the course of the inventive process. The silicate is typically selected from the group consisting of the alkali metal silicates. The silicate is advantageously selected from the group consisting of sodium and potassium silicate. The silicate may be in any known form, such as metasilicate or disilicate.

In the case where sodium silicate is used, the latter generally has an $SiO_2/Na_2O$ weight ratio of from 2.0 to 4.0, in particular from 2.4 to 3.9, for example from 3.1 to 3.8.

The silicate may have a concentration (expressed in terms of $SiO_2$) of from 3.9 wt % to 25.0 wt %, for example from 5.6 wt % to 23.0 wt %, in particular from 5.6 wt % to 20.7 wt %.

The term "acid" is used herein to refer to one or more than one acid which can be added during the course of the inventive process. Any acid may be used in the process. Use is generally made of a mineral acid, such as sulfuric acid, nitric acid, phosphoric acid or hydrochloric acid, or of an organic acid, such as carboxylic acids, e.g. acetic acid, formic acid or carbonic acid.

The acid may be metered into the reaction medium in diluted or concentrated form. The same acid at different concentrations may be used in different stages of the process. Preferably the acid is sulfuric acid.

In a preferred embodiment of the process sulfuric acid and sodium silicate are used in all of the stages of the process. Preferably, the same sodium silicate, that is sodium silicate having the same concentration expressed as $SiO_2$, is used in all of the stages of the process.

In step (i) of the process a starting solution having a pH from 2.0 to 5.0 is provided in the reaction vessel. The starting solution is an aqueous solution, the term "aqueous" indicating that the solvent is water.

Preferably, the starting solution has a pH from 2.5 to 5.0, especially from 2.8 to 4.4; for example, from 3.0 to 4.0.

The starting solution may be obtained by adding an acid to water so as to obtain a pH value as detailed above. Alternatively, the starting solution may contain a silicate. In such a case it may be obtained by adding acid to a mixture of water and silicate to obtain a pH from 2.0 to 5.0.

The starting solution of step (i) may or may not comprise an electrolyte. Preferably, the starting solution of step (i) contains an electrolyte.

The term "electrolyte" is used herein in its generally accepted meaning, i.e. to identify any ionic or molecular substance which, when in solution, decomposes or dissociates to form ions or charged particles. The term "electrolyte" is used herein to indicate one or more than one electrolyte may be present. Mention may be made of electrolytes such as the salts of alkali metals and alkaline-earth metals. Advantageously, the electrolyte for use in the starting solution is the salt of the metal of the starting silicate and of the acid used in the process. Notable examples are for example sodium chloride, in the case of the reaction of a sodium silicate with hydrochloric acid or, preferably, sodium sulfate, in the case of the reaction of a sodium silicate with sulfuric acid. The electrolyte does not contain aluminium.

Preferably, when sodium sulfate is used as electrolyte in step (i), its concentration in the starting solution is from 8 to 40 g/L, especially from 10 to 35 g/L, for example from 10 to 30 g/L.

Step (ii) of the process comprises a simultaneous addition of an acid and of a silicate to the starting solution. The rates of addition of the acid and of the silicate during step (ii) are controlled in such a way that the pH of the reaction medium is maintained in the range from 2.0 to 5.0. The pH of the reaction medium is preferably maintained in the range from 2.5 to 5.0, especially from 2.8 to 5.0, for example from 2.8 to 4.5.

The simultaneous addition in step (ii) is advantageously performed in such a manner that the pH value of the reaction medium is always equal (to within±0.2 pH units) to the pH reached at the end of step (i).

Preferably, step (ii) consists of a simultaneous addition of acid and silicate as detailed above.

In one embodiment of the inventive process, an intermediate step (ii') may be carried out between step (i) and step (ii), wherein a silicate and an acid are added to the starting solution such that the pH of the reaction medium is maintained in the range from 2.0 to 9.5. The addition of silicate and acid can be simultaneous for all or for only a part of step (ii'). Step (ii') is typically protracted for 1 to 10 minutes, preferable for 2 to 8 minutes before step (ii) is initiated.

Next, in step (iii), the addition of the acid and of the silicate is stopped and a base is added to the reaction medium. The addition of the base is stopped when the pH of the reaction medium has reached a value of from 7.0 to 10.0, preferably from 7.5 to 9.5.

In a first embodiment of the process the base is a silicate. Thus, in step (iii), the addition of the acid is stopped while the addition of the silicate to the reaction medium is continued until a pH of from 7.0 to 10.0, preferably from 7.5 to 9.5, is reached.

In a second embodiment of the process the base is different from a silicate and it is selected from the group consisting of the alkali metal hydroxides, preferably sodium or potassium hydroxide. When sodium silicate is used in the process a preferred base may be sodium hydroxide.

Thus, in this second embodiment of the process, in step (iii), the addition of the acid and of the silicate is stopped and a base, different from a silicate, is added to the reaction medium until a pH of from 7.0 to 10.0, preferably from 7.5 to 9.5, is reached.

At the end of step (iii), that is after stopping the addition of the base, it may be advantageous to perform a maturing step of the reaction medium. This step is preferably carried out at the pH obtained at the end of step (iii). The maturing step may be carried out while stirring the reaction medium. The maturing step is preferably carried out under stirring of the reaction medium over a period of 2 to 45 minutes, in particular from 5 to 25 minutes. Preferably the maturing step does not comprise any addition of acid or silicate.

After step (iii) and the optional maturing step, a simultaneous addition of an acid and of a silicate is performed, such that the pH of the reaction medium is maintained in the range from 7.0 to 10.0, preferably from 7.5 to 9.5.

The simultaneous addition of an acid and of a silicate (step (iv)) is typically performed in such a manner that the pH value of the reaction medium is maintained equal to the pH reached at the end of the preceding step (to within±0.2 pH units), step (iii).

It should be noted that the inventive process may comprise additional steps. For example, between step (iii) and step (iv), and in particular between the optional maturing step following step (iii) and step (iv), an acid can be added to the reaction medium. The pH of the reaction medium after this addition of acid should remain in the range from 7.0 to 9.5, preferably from 7.5 to 9.5.

In step (v), the addition of the silicate is stopped while continuing the addition of the acid to the reaction medium so as to obtain a pH value in the reaction medium of less than 5.5, preferably from 3.0 to 5.5, in particular from 3.0 to 5.0. A suspension of precipitated silica is obtained in the reaction vessel.

At the end of step (v), and thus after stopping the addition of the acid to the reaction medium, a maturing step may advantageously be carried out. This maturing step may be carried out at the same pH obtained at the end of step (v) and under the same time conditions as those described above for the maturing step which may be optionally carried out between step (iii) and (iv) of the process.

The reaction vessel in which the entire reaction of the silicate with the acid is performed is usually equipped with adequate stirring and heating equipment.

The entire reaction of the silicate with the acid (steps (i) to (v)) is generally performed at a temperature from 40 to 97° C., in particular from 60 to 96° C., preferably from 80 to 956° C., more preferably from 85 to 95° C.

According to one variant of the invention, the entire reaction of the silicate with the acid is performed at a constant temperature, usually of from 40 to 97° C., in particular from 80 to 956° C., and even from 85 to 95° C.

According to another variant of the invention, the temperature at the end of the reaction is higher than the temperature at the start of the reaction: thus, the temperature at the start of the reaction (for example during steps (i) to (iii)) is preferably maintained in the range from 40 to 92° C. and the temperature is then increased, preferably up to a value in the range from 80 to 96° C., even from 85 to 95° C., at which value it is maintained (for example during steps (iv) and (v)), up to the end of the reaction.

At the end of the steps that have just been described, a suspension of precipitated silica is obtained, which is subsequently separated (liquid/solid separation). The process typically comprises a further step (vi) of filtering the suspension and drying the precipitated silica.

The separation performed in the preparation process according to the invention usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation during which a mineral acid is added to the filter cake. The acid is selected among the group consisting of sulfuric acid, hydrochloric acid, phosphoric acid, nitric acid. The acid is preferably sulfuric acid or phosphoric acid. The amount of the mineral acid added to the filter cake during the liquefaction step is such that the pH of the resulting precipitated silica is less than 5.5, preferably less than 4.5. The pH may be even less than 3.5, although it is generally not lower than 3.0.

The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill.

During the liquefaction step an aluminium compound may be added to the filter cake, with the proviso that the pH of the resulting precipitated silica is less than 5.5, preferably less than 5.0.

The suspension of precipitated silica which is obtained after the liquefaction step is subsequently preferably dried.

Drying may be performed according to means known in the art. Preferably, the drying is performed by atomization. To this end, use may be made of any type of suitable atomizer, in particular a turbine, nozzle, liquid pressure or two-fluid spray-dryer. In general, when the filtration is performed using a filter press, a nozzle spray-dryer is used, and when the filtration is performed using a vacuum filter, a turbine spray-dryer is used.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

When the drying operation is performed using a turbine spray-dryer, the precipitated silica that may then be obtained may be in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting.

The precipitated silica that may then be obtained via this agglomeration step is generally in the form of granules.

The precipitated silica according to the present invention or obtained by the process described above according to the invention can be used in numerous applications.

The inventive precipitated silica can be employed, for example, as catalyst support. It may be used as absorbent for active materials, such as liquids, especially used in food, such as vitamins (vitamin E) or choline chloride. It can be used as viscosifying, texturizing or anticaking agent, as battery separator component, or as additive for toothpaste, concrete, or paper.

However, the inventive precipitated silica finds a particularly advantageous application in the reinforcement of natural or synthetic polymers.

Elastomeric compositions containing the inventive silica were found to have improved mechanical and reinforcement properties with respect to compositions comprising precipitated silica having pH higher than 5.5. The improved ability to disperse even at high surface areas of the inventive silica provides polymer compositions having better energy dissipation properties and even improved wear resistance.

The use of the inventive silica also provides for improved processing properties of the elastomeric compositions, in particular when high specific surface silicas are used, e.g. precipitated silicas having a CTAB surface area greater than 190 $m^2/g$, typically even greater than 210 $m^2/g$.

Accordingly, a further object of the invention is a composition comprising the inventive silica as above defined and at least one polymer. The phrase "at least one" when referred to the polymer in the composition is used herein to indicate that one or more than one polymer of each type can be present in the composition.

The expression "copolymer" is used herein to refer to polymers comprising recurring units deriving from at least two monomeric units of different nature.

The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The inventive silica may advantageously be employed as reinforcing filler in elastomeric compositions. Accordingly a preferred object of the invention is a composition comprising the inventive silica and one or more elastomers, preferably exhibiting at least one glass transition temperature between −150° C. and +300° C., for example between −150° C. and +20° C.

Notable non-limiting examples of suitable elastomers are diene elastomers. For example, use may be made of elastomers deriving from aliphatic or aromatic monomers, comprising at least one unsaturation such as, in particular, ethylene, propylene, butadiene, isoprene, styrene, acrylonitrile, isobutylene or vinyl acetate, polybutyl acrylate, or their mixtures. Mention may also be made of functionalized elastomers, that is elastomers functionalized by chemical groups positioned along the macromolecular chain and/or at one or more of its ends (for example by functional groups capable of reacting with the surface of the silica), and halogenated polymers. Mention may be made of polyamides, ethylene homo- and copolymer, propylene homo- and copolymer.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or crosslinked, in particular with peroxides or other crosslinking systems (for example diamines or phenolic resins).

In general, the polymer compositions additionally comprise at least one coupling agent and/or at least one covering agent; they can also comprise, inter alia, an antioxidant.

Use may in particular be made, as coupling agents, as nonlimiting examples, of "symmetrical" or "unsymmetrical" silane polysulfides; mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state or grafted at the surface of the silica. The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200% by weight, in particular from 20% to 150% by weight, especially from 20% to 80% by weight, for example from 30% to 70% by weight. Alternatively proportion by weight of the inventive silica in the polymer composition can be from 80% to 120% by weight, for example from 90% to 110% by weight, of the amount of the polymer(s).

The silica according to the invention can advantageously constitute all of the reinforcing inorganic filler and even all of the reinforcing filler of the polymer composition.

The silica according to the invention can optionally be combined with at least one other reinforcing filler, such as, in particular, a commercial highly dispersible silica, such as, for example, Zeosil® 1165 MP, Zeosil® 1115 MP or Zeosil® 1085 MP (commercially available from Solvay); another reinforcing inorganic filler, such as, for example, alumina, indeed even a reinforcing organic filler, in particular carbon black (optionally covered with an inorganic layer, for example of silica). The silica according to the invention then preferably constitutes at least 50% by weight, indeed even at least 80% by weight, of the total amount of the reinforcing filler.

The compositions comprising the precipitated silica of the invention may be used in the manufacture of a number of articles. Non-limiting examples of articles comprising the inventive silica or the polymer composition described above, are for instance footwear soles, floor coverings, gas barriers, flame-retardant materials and also engineering components, such as rollers for cableways, seals for domestic electrical appliances, seals for liquid or gas pipes, braking system seals, pipes, sheathings, in particular cable sheathings, cables, engine supports, battery separators, conveyor belts, transmission belts or, dampers. Advantageously, the inventive silica may be used in the manufacture of tires, in particular tire treads, especially for light vehicles or for heavy-load vehicles.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Analytical Methods

The physicochemical properties of the precipitated silica of the invention were determined using the methods described hereafter.

Determination of CTAB Surface Area

CTAB surface area ($S_{CTAB}$) values were determined according to an internal method derived from standard NF ISO 5794-1, Appendix G.

Determination of BET Surface Area

BET surface area $S_{BET}$ was determined according to the Brunauer-Emmett-Teller method as detailed in standard NF ISO 5794-1, Appendix E (June 2010) with the following adjustments: the sample was pre-dried at 200° C.±10° C.; the partial pressure used for the measurement P/P° was between 0.05 and 0.3.

Determination of the Particle Size Distribution and Particle Size by Centrifugal Sedimentation in a Disc Centrifuge (CPS)

Values of d50, d16, d84 and Ld were determined centrifugal sedimentation in a disc centrifuge using a centrifugal photosedimentometer type "CPS DC 24000UHR", marketed by CPS Instruments company. This instrument is equipped with operating software supplied with the device (operating software version 11 g).

Instruments used: for the measurement requirement, the following materials and products were used: Utrasound system: 1500 W generator type Sonics Vibracell VC1500/VCX1500 equipped with 19 mm probe (Converters: CV154+Boosters (Part No: BHNVC21)+19 mm Probe (Part No: 630-0208)).

Analytical balance with a precision of 0.1 mg (e.g. Mettler AE260); Syringes: 1.0 ml and 2.0 ml with 20ga needles; high shape glass beaker of 50 mL (SCHOTT DURAN: 38 mm diameter, 78 mm high); magnetic stirrer with a stir bar of 2 cm; vessel for ice bath during sonication.

Chemicals: deionized water; ethanol 96%; sucrose 99%; dodecane, all from Merck; PVC reference standard from CPS Instrument Inc.; the peak maximum of the reference standard used should be between 200 and 600 nm (e.g. 237 nm).

Preparation of the Disc Centrifuge

For the measurements, the following parameters were established. For the calibration standard parameters, the information of the PVC reference communicated by the supplier were used.

| Sample Parameters | | |
| --- | --- | --- |
| max. diameter | μm | 0.79 |
| min. diameter | μm | 0.02 |
| particle density | g/mL | 2.11 |
| particle refrative index | | 1.46 |
| particle absorption | K | 0.001 |
| non-sphericity factor | | 1 |

| Calibration Standard Parameters | | |
| --- | --- | --- |
| peak diameter | nm | 237 |
| half height peak width | μm | 0.023 |
| particle density | | 1.385 |

| Fluid Parameters | | |
| --- | --- | --- |
| fluid density | g/mL | 1.051 |
| fluid Refractive Index | | 1.3612 |
| fluid viscosity | cps$^x$ | 1.28 |

$^x$cps = centipoise

System Configuration

The measurement wavelength was set to 405 nm. The following runtime options parameters were established:

| | |
| --- | --- |
| Force Baseline: | Yes |
| Correct for Non-Stokes: | No |
| Extra Software Noise Filtration: | No |
| Baseline Drift Display: | Show |
| Calibration method: | External |
| Samples per calibration: | 1 |

All the others options of the software are left as set by the manufacturer of the instrument.

Preparation of the Disc Centrifuge

The centrifugal disc is rotated at 24000 rpm during 30 min. The density gradient of sucrose (CAS n°57-50-1) is prepared as follows:

In a 50 mL beaker, a 24% in weight aqueous solution of sucrose is prepared. In a 50 mL beaker, a 8% in weight aqueous solution of sucrose is prepared. Once these two solutions are homogenized separately, samples are taken from each solution using a 2 mL syringe which is injected into the rotating disc in the following order:

Sample 1: 1.8 mL of the 24 wt % solution
Sample 2: 1.6 mL of the 24 wt % solution+0.2 mL of the 8 wt % solution
Sample 3: 1.4 mL of the 24 wt % solution+0.4 mL of the 8 wt % solution
Sample 4: 1.2 mL of the 24 wt % solution+0.6 mL of the 8 wt % solution
Sample 5: 1.0 mL of the 24 wt % solution+0.8 mL of the 8 wt % solution
Sample 6: 0.8 mL of the 24 wt % solution+1.0 mL of the 8 wt % solution
Sample 7: 0.6 mL of the 24 wt % solution+1.2 mL of the 8 wt % solution
Sample 8: 0.4 mL of the 24 wt % solution+1.4 mL of the 8 wt % solution
Sample 9: 0.2 mL of the 24 wt % solution+1.6 mL of the 8 wt % solution
Sample 10: 1.8 mL of the 8 wt % solution Before each injection into the disk, the two solutions are homogenized in the syringe by aspiring about 0.2 mL of air followed by brief manual agitation for a few seconds, making sure not to lose any liquid.

These injections, the total volume of which is 18 mL, aim to create a density gradient useful for eliminating certain instabilities which may appear during the injection of the sample to be measured. To protect the density gradient from evaporation, we add 1 mL of dodecane in the rotating disc using a 2 mL syringe. The disc is then left in rotation at 24000 rpm for 60 min before any first measurement.

Sample Preparation 3.2 g of silica in a 50 mL high shape glass beaker (SCHOTT DURAN: diameter 38 mm, height 78 mm) were weighed and 40 mL of deionized water were added to obtain a 8 wt % suspension of silica. The suspension was stirred with a magnetic stirrer (minimum 20 s) before placing the beaker into a crystallizing dish filled with ice and cold water. The magnetic stirrer was removed and the crystallizing dish was placed under the ultrasonic probe placed at 1 cm from the bottom of the beaker. The ultrasonic probe was set to 56% of its maximum amplitude and was activated for 8 min. At the end of the sonication the beaker was placed again on the magnetic stirrer with a 2 cm magnetic stir bar stirring at minimum 500 rpm until after the sampling.

The ultrasonic probe should be in proper working conditions. The following checks have to be carried out and in case of negative results a new probe should be used: visual check of the physical integrity of the end of the probe (depth of roughness less than 2 mm measured with a fine caliper); the measured d50 of commercial silica Zeosil® 1165MP should be 93 nm±3 nm.

Analysis

Before each samples was analysed, a calibration standard was recorded. In each case 0.1 mL of the PVC standard provided by CPS Instruments and whose characteristics were previously entered into the software was injected. It is important to start the measurement in the software simultaneously with this first injection of the PVC standard. The confirmation of the device has to be received before injecting 100 μL of the previously sonicated sample by making sure that the measurement is started simultaneously at the injection.

These injections were done with 2 clean syringes of 1 mL.

At the end of the measurement, which is reached at the end of the time necessary to sediment all the particles of smaller diameter (configured in the software at 0.02 μm), the ratio for each diameter class was obtained. The curve obtained is called aggregate size distribution.

Results: The values d50, d16, d84 and Ld are on the basis of distributions drawn in a linear scale. The integration of the particle size distribution function of the diameter allows obtaining a "cumulative" distribution, that is to say the total mass of particles between the minimum diameter and the diameter of interest.

d50: is the diameter below and above which 50% of the population by mass is found. The d50 is called median size, that is diameter, of the silica aggregate.

d84: is the diameter below which 84% of the total mass of aggregates is measured.

d16: is the diameter below which 16% of the total mass of aggregates is measured.

Ld: is calculated according to equation: Ld=(d84−d16)/d50

Determination of Pore Volume and Size of Pores by Mercury Porosimetry

Pore volume and pore size distribution were determined using a Micromeritics AutoPore® IV 9520 porosimeter; they were calculated by the Washburn relationship with a contact angle theta equal to 140° and a surface tension gamma equal to 485 dynes/cm. Each sample was dried before the measure in an oven at 200° C. for 2 hours at atmospheric pressure. The starting weight of silica placed in the type 10 Penetrometer, having an accuracy of 0.001 g, was selected for good reproducibility of the measurement, in such a way that the "stem volume used", i.e. the percentage mercury (Hg) volume consumed for filling of the penetrometer was from 40% to 80%. The penetrometer was then slowly evacuated to 50 μm of Hg and kept at this pressure for 5 min.

The AutoPore® equipment was operated using Software Version IV 1.09. No corrections were performed on the raw data. The measurement range was from 3.59 kPa (0.52 psi) to 413685 kPa (60000 psi), and at least 100 measurement points were used (19 measurement points from 3.59 kPa (0.52 psi) to 193 kPa (28 psi) with 10 seconds of equilibrium time and then 81 points from 1.93 kPa (0.28 psi) to 413685 kPa (60000 psi) with a 20 seconds equilibrium time). If appropriate, the software introduced further measurement points if the incremental intrusion volume was>0.5 mL/g. The intrusion curve was smoothed by means of the "smooth differentials" function of the equipment software.

The Log Differential Intrusion (mL/g) versus pore size data was analysed in the pore diameter range from 3.5 nm to 5 μm.

The pore volumes and pore diameters/radii given are measured by mercury (Hg) porosimetry using a Micromeritics Autopore IV 9520 porosimeter and are calculated by the Washburn relationship with a contact angle theta equal to 140° and a surface tension gamma equal to 485 dynes/cm; each sample is prepared as follows: each sample is dried beforehand in an oven at 200° C. for 2 hours.

pH Determination

The pH is measured according to the following method deriving from the standard ISO 787/9 (pH of a 5% suspension in water):

Equipment: calibrated pH meter (accuracy of reading to 1/100th), combined glass electrode, 200 mL beaker, 100 mL measuring cylinder, balance accurate to within about 0.01 g.

Procedure: 5.00 grams of silica are weighed to within about 0.01 gram into the 200 mL beaker. 95 mL of water, measured from the graduated measuring cylinder, are subsequently added to the silica powder. The suspension thus obtained is vigorously stirred (magnetic stirring) for 10 minutes. The pH measurement is then carried out.

Disagglomeration Test (Disagglomeration Rate α)

A disagglomeration rate, denoted α, was measured by means of an ultrasonic disintegration test, at 55% amplitude of a 750 watt probe (equivalent to a power delivered to the system of 90+/−5 W), operating in continuous mode (the adjustment of the probe was done with a reference silica sample). To prevent the ultrasonic probe from heating up excessively during the measurement the converter of the ultrasonic probe was cooled down with a flux of compressed air and the sonicated suspension was placed into an ice bath. This test allows the variation in the volume-average size of the particle agglomerates to be continuously measured during sonication.

The set-up used consists of a laser particle size analyser (of the MASTERSIZER 3000 type sold by Malvern Instruments: He—Ne laser source emitting in the red at a wavelength of 632.8 nm and blue at a wavelength of 470 nm) and of its preparation station (Malvern Hydro MV Unit), between which a continuous flux stream treatment cell (10-50 mL reaction vessel from Sonics Materials) fitted with an ultrasonic probe (750 watt LAB 750-type 13 mm sonicator sold by SynapTec) was inserted. A small quantity (100 mg) of silica to be analysed was introduced with 160 mL of water into the preparation station, the rate of circulation being set at its maximum (i.e. 3500 rpm). At least three consecutive measurements were carried out in order to determine, using the Mie calculation method (refractive index of 1.44 and absorption index of 0.01; Malvern V3.50 software), the initial volume-average diameter of the agglomerates, denoted $d_V[0]$. Sonication (continuous mode) was then applied at 55% power (i.e. 55% of the maximum position of the tip amplitude or a power delivered to the system of 90+/−5 W) and the variation in the volume-average diameter $d_V[t]$ as a function of time t was monitored for about 8 minutes, a measurement being taken approximately every 12 seconds. After an induction period (about 3-4 minutes), it is observed that the inverse of the volume-average diameter $1/d_V[t]$ varies linearly, or substantially linearly, with time t (disintegration steady state). The rate of disintegration α is calculated by linear regression from the curve of variation of $1/d_V[t]$ as a function of time t in the disintegration steady state region (in general, between 4 and 8 minutes approximately); it is expressed in $\mu m^{-1} \cdot min^{-1}$.

WO 99/28376 describes in detail a measurement device that can be used for carrying out this ultrasonic disintegration test.

Determination of Carbon Content

The content of carbon was measured using a carbon/sulfur analyzer, such as the Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron). The carbon present in the sample to be analyzed (weight of approximately 0.2 gram) combines with the oxygen to form $CO_2$, CO. These gases are subsequently analyzed by an infrared detector. The moisture from the sample and the water produced during these oxidation reactions is removed by passing over a cartridge comprising a dehydrating agent (magnesium perchlorate) in order not to interfere with the infrared measurement. The result is expressed as weight of element carbon in ppm.

Determination of Content of Aluminium

The amount of aluminum was measured using XRF wavelength dispersive X-ray fluorescence spectrometry (using a WDXRF Panalytical instrument). Sample analyses were performed under helium in a 4 cm diameter cell using silica powder contained in the cell covered by a thin Prolene film (4 μm Chemplex®) over a range of 0.1 to 3.0% $Al/SiO_2$.

Al and Si fluorescence were measured using the following parameters: Al Kα angle 2θ=144,9468° (20 s), background signal angle 2θ=−1,2030° (4 s), Si Kα angle 2θ=109,1152° (10 s), tube power 4 kW (32 kV, 125 mA), PE002 crystal and 550 μm collimator, gas flux detector.

The content of aluminum in samples containing over 3.0% Al/SiO₂ was determined by means of ICP OES (inductively coupled plasma optical emission spectrometry) after digestion of the sample in fluorhydric acid (eg. 0.2-0.3 g of $SiO_2$ with 1 mL of fluorhydric acid 40%). The limpid solution was diluted in a 5% nitric acid aqueous solution according to the expected Al concentration. The intensity measured on the Al specific wavelength (396.152 nm) was compared to a calibration curve in the range of 0.05 to 2.00 mg/L obtained using aluminum standards (4 standards at 0.10, 0.20, 1.00 and 2.00 mg/L) in similar analytical conditions. The amount in the solid was obtained by calculation using the dilution factor and the dry extract of the silica measured.

Determination of Number of Silanols per nm²

The number of silanols per nm² of surface area is determined by grafting methanol onto the surface of the silica. Firstly, 1 gram of silica was suspended in 10 mL of methanol, in a stirred autoclave. The autoclave, hermetically sealed and thermally insulated, was heated to 200° C. (40 bar) for 4 hours. The autoclave was then cooled in a cold water bath. The grafted silica was recovered by settling and the residual methanol evaporated in a stream of nitrogen. The grafted silica was vacuum dried for 12 hours at 130° C. The carbon content was determined by an elemental analysis. The number of silanols per nm² is calculated using the following formula:

$$N_{SiOH/nm2}=[(\%\ Cg-\%\ Cr)\times 6.023\times 10^{23}]/[S_{BET}\times 10^{18}\times 12\times 100]$$

where % Cg: percent mass of carbon present on the grafted silica;

% Cr: percent mass of carbon present on the raw silica.

EXAMPLES

Example 1

960 liters of water were introduced into a 2500 liter reactor and heated to 90° C. 15 kg of solid sodium sulfate were introduced into the reactor under stirring. Sulfuric acid (concentration: 96 wt %) was then added until the pH reached 3.8.

A sodium silicate solution ($SiO_2/Na_2O$ weight ratio equal to 3.41 and density equal to 1.231 kg/L) was introduced into the reactor over a period of 25 minutes, at a flow rate of 370 L/h, simultaneously with sulfuric acid (concentration: 7.7 wt %). The flow rate was regulated so as to maintain the pH of the reaction medium at a value of 3.9.

After 25 minutes of simultaneous addition at 90° C., the introduction of acid was stopped and the pH of the reaction medium allowed to reach 8.0. Meanwhile the temperature was increased to 94° C. A further simultaneous addition was then performed over the course of 18 minutes with a sodium silicate flow rate of 600 L/h (same sodium silicate as for the first simultaneous addition) and a flow rate of sulfuric acid (concentration: 7.7 wt %) regulated so as to maintain the pH of the reaction medium at a value of 8.0.

After this simultaneous addition, the reaction medium was brought to a pH of 4.5 by introduction of sulfuric acid (concentration: 7.7 wt %). 2070 liters of precipitated silica suspension were obtained after this operation.

The suspension was filtered and washed on a filter press, to give a precipitated silica cake with a solids content of 19.2% by weight.

Example 2

A portion of the silica cake obtained in Example 1 was then subjected to a liquefaction step in a continuous vigorously stirred reactor with addition to the cake of 1709 grams of a sulfuric acid solution (concentration: 7.7 wt %).

The liquefied cake was subsequently spray dried using a nozzle atomizer to provide silica S1. The properties of silica S1 are reported below.

|    | $S_{CTAB}$ (m²/g) | $S_{BET}$ (m²/g) | Ld | d50 (nm) | pH | CPS $V_{(d5-d50)}/V_{(d5-d100)}$ | C (ppm) | α (μm⁻¹min⁻¹) |
|----|---|---|---|---|---|---|---|---|
| S1 | 250 | 277 | 1.5 | 87 | 4.0 | 0.70 | 0 | $0.7 \times 10^{-2}$ |

Comparative Example 1

A second portion of the silica cake obtained in Example 1 was subjected to a liquefaction step in a continuous vigorously stirred reactor with simultaneous addition to the cake of sulfuric acid (concentration: 7.7 wt %) and of a sodium aluminate solution (Al/SiO₂ ratio: 0.30 wt %).

The liquefied cake was subsequently spray dried using a nozzle atomizer to provide silica CS1. The properties of silica CS1 are reported below.

|    | $S_{CTAB}$ (m²/g) | $S_{BET}$ (m²/g) | Ld | d50 (nm) | pH | CPS $V_{(d5-d50)}/V_{(d5-d100)}$ | C (ppm) | α (μm⁻¹min⁻¹) |
|----|---|---|---|---|---|---|---|---|
| CS1 | 258 | 280 | 1.4 | 83 | 6.3 | 0.69 | 0 | $0.5 \times 10^{-2}$ |

The disagglomeration rate α of silica S1 according to the invention is 40% higher than that of CS1, this indicates a better ability of silica S1 to disagglomerate.

Example 3

1117 liters of water were introduced into a 2500 liter reactor and heated to 92° C. 17.9 kg of solid sodium sulfate were introduced into the reactor under stirring. Sulfuric acid (concentration: 96 wt %) was then added until the pH of the mixture reached 4.1.

A sodium silicate solution ($SiO_2/Na_2O$ weight ratio equal to 3.44 and a density equal to 1.231 kg/L) was introduced into the reactor over a period of 25 minutes, at a flow rate of 432 L/h, simultaneously with sulfuric acid (concentration: 7.7 wt %). The flow rate was regulated so as to maintain the pH of the reaction medium at a value of 4.2.

After 25 minutes of simultaneous addition at 92° C., the introduction of acid was stopped and the pH was allowed to reach the value of 8.0 by continuing the addition of sodium silicate. Meanwhile the temperature was increased to 96° C. A further simultaneous addition was then performed over the course of 18 minutes with a sodium silicate flow rate of 709 L/h and a flow rate of sulfuric acid (concentration: 96 wt %) regulated so as to maintain the pH of the reaction medium at a value of 8.0.

After this simultaneous addition, the reaction medium was brought to a pH of 4.5 by introduction of sulfuric acid (concentration: 96 wt %). 2060 liters of a precipitated silica suspension were obtained after this operation.

The precipitated silica suspension was filtered and washed on a filter press, to give a precipitated silica cake with a solids content of 22.5% by weight.

The silica cake obtained was subjected to a liquefaction step in a continuous vigorously stirred reactor with addition to the cake of 1452 grams of a sulfuric acid solution (concentration: 7.7 wt %).

This liquefied cake was subsequently spray dried using a nozzle atomizer to provide silica S2. The properties of silica S2 are reported below.

|  | $S_{CTAB}$ (m²/g) | $S_{BET}$ (m²/g) | CPS Ld | d50 (nm) | pH | $V_{(d5-d50)}/V_{(d5-d100)}$ | C (ppm) | α (μm⁻¹min⁻¹) |
|---|---|---|---|---|---|---|---|---|
| S2 | 200 | 228 | 1.8 | 114 | 4.4 | 0.72 | 0 | $0.9 \times 10^{-2}$ |

Comparative Example 2

1112 liters of water were introduced into a 2500 liter reactor and heated to 92° C. 17.9 kg of solid sodium sulfate were introduced into the reactor under stirring. Sulfuric acid with a concentration of 96 wt % was then added until the pH reached 4.1.

A sodium silicate solution (with an $SiO_2/Na_2O$ weight ratio equal to 3.44 and a density equal to 1.231 kg/L) was introduced into the reactor over a period of 25 minutes, at a flow rate of 432 L/h, simultaneously with sulfuric acid (concentration: 7.7 wt %). The flow rate was regulated so as to maintain the pH of the reaction medium at a value of 4.2.

After 25 minutes of simultaneous addition at 92° C., the introduction of acid was stopped and the pH allowed to reach the value of 8.0 by addition of sodium silicate. Meanwhile the temperature was increased to 96° C. A further simultaneous addition was then performed over the course of 18 minutes with a sodium silicate flow rate of 709 L/h and a flow rate of sulfuric acid (concentration: 96 wt %) regulated so as to maintain the pH of the reaction medium at a value of 8.0.

After this simultaneous addition, the reaction medium was brought to a pH of 4.4 by introduction of sulfuric acid (concentration: 96 wt %). 2060 liters of precipitated silica suspension were obtained after this operation.

The precipitated silica suspension was filtered and washed on a filter press, to give a precipitated silica cake with a solids content of 22.0% by weight.

Silica cake obtained was then subjected to a liquefaction step in a continuous vigorously stirred reactor with addition to the cake of 3748 grams of a sulfuric acid solution (concentration: 7.7 wt %) and 2021 grams of a solution of sodium aluminate ($Al_2O_3$ content of 22.5 wt %).

This liquefied cake was subsequently spray dried using a nozzle atomizer to provide silica CS2. The properties of silica CS2 are reported below.

|  | $S_{CTAB}$ (m²/g) | $S_{BET}$ (m²/g) | CPS Ld | d50 (nm) | pH | $V_{(d5-d50)}/V_{(d5-d100)}$ | C (ppm) | α (μm⁻¹min⁻¹) |
|---|---|---|---|---|---|---|---|---|
| CS2 | 193 | 220 | 1.8 | 110 | 6.3 | 0.72 | 0 | $0.7 \times 10^{-2}$ |

The disagglomeration rate α of the silica S2 according to the invention is 26% higher than that of CS2 which indicates a better tendency of silica S2 to disagglomerate.

Example 4

1104 liters of water were introduced into a 2500 liter reactor and heated to 90° C. 17.6 kg of solid sodium sulfate were introduced into the reactor under stirring. Sulfuric acid (concentration: 96 wt %) was then added until the pH of the mixture reached 4.1.

A sodium silicate solution (with an $SiO_2/Na_2O$ weight ratio equal to 3.44 and a density equal to 1.231 kg/L) was introduced into the reactor over a period of 25 minutes, at a flow rate of 430 1 L/h, simultaneously with sulfuric acid (concentration: 7.7 wt %). The flow rate was regulated so as to maintain the pH of the reaction medium at a value of 4.1.

After the 25 minutes of simultaneous addition at 90° C., the introduction of acid was stopped and the pH was allowed to reach a value of 8.0. Meanwhile the temperature was increased to 94° C. A further simultaneous addition was then performed over the course of 13 minutes with a sodium silicate flow rate of 701 L/h and a flow rate of sulfuric acid (concentration: 96 wt %) regulated so as to maintain the pH of the reaction medium at a value of 8.0.

After this simultaneous addition, the reaction medium was brought to a pH of 4.5 by introduction of sulfuric acid (concentration: 96 wt %). 2060 liters of a precipitated silica suspension were obtained after this operation.

The precipitated silica suspension was filtered and washed on a filter press, to give a precipitated silica cake with a solids content of 20.4% by weight.

Silica cake obtained was subjected to a liquefaction step in a continuous vigorously stirred reactor with addition to the cake of 1642 grams of a phosphoric acid solution at a concentration of 1 mol/L to reach a pH of 4.6.

This liquefied cake was subsequently dried using a nozzle atomizer to provide silica S3. The properties of silica S3 are reported below.

|    | $S_{CTAB}$ (m²/g) | $S_{BET}$ (m²/g) | Ld | d50 (nm) | pH | CPS $V_{(d5-d50)}/V_{(d5-d100)}$ | C (ppm) | α (μm⁻¹min⁻¹) |
|----|-----|-----|-----|-----|-----|-----|-----|-----|
| S3 | 247 | 286 | 1.6 | 97 | 5.2 | 0.72 | 0 | $0.5 \times 10^{-2}$ |

Example 5

In a 25 L stainless steel reactor were introduced 15.7 L of purified water and 244 g of Na₂SO₄ (solid). The solution was stirred and heated to reach 92° C. The entire reaction was carried out at this temperature. Sulfuric acid solution (concentration: 7.7 wt %) was metered into the reactor until the pH of the medium reached a value of 4.5.

Then, a sodium silicate solution (SiO₂/Na₂O ratio=3.43; SiO₂ concentration=19.6 wt %) was introduced over a period of 12.5 min at a flow rate of 103 g/min simultaneously with sulfuric acid (concentration: 7.7 wt %). The flow rate of the sulfuric acid solution was regulated so that the pH of the reaction medium was maintained at a value of 4.5.

The introduction of acid was stopped while the addition of the silicate was maintained at a flow rate of 108 g/min until the pH of the reaction medium reached a value of 8.0.

Simultaneously, over a period of 15.3 min, were metered sodium silicate at a flow rate of 163 g/min and sulfuric acid (concentration: 95 wt %). The sulfuric acid flow rate was regulated so that the pH of the reaction medium was maintained at a value of 8.0.

At the end of the simultaneous addition, the pH of the reaction medium was brought to 4.8 with sulfuric acid (concentration: 95 wt %). The reaction mixture was allowed to stand for 5 minutes. The silica suspension thus obtained was filtered and washed on a filter press.

Silica cake thus obtained was subjected to a mechanical liquefaction step while water was added to reach a solid content at 19.7 wt %. The pH of the resulting silica suspension was brought to 3.0 by the addition of sulfuric acid (concentration: 7.7 wt %). The resulting suspension was dried by means of a nozzle spray dryer to obtain precipitated silica S4. The properties of silica S4 are reported below.

|    | $S_{CTAB}$ (m²/g) | $S_{BET}$ (m²/g) | Ld | d50 (nm) | pH | CPS $V_{(d5-d50)}/V_{(d5-d100)}$ | C (ppm) | α (μm⁻¹min⁻¹) |
|----|-----|-----|-----|-----|-----|-----|-----|-----|
| S4 | 184 | 213 | 1.7 | 107 | 4.1 | 0.72 | 0 | $1.5 \times 10^{-2}$ |

Example 6

In a 25 L stainless steel reactor were introduced 14.44 L of purified water and 160.8 g of Na₂SO₄ (solid). The solution was stirred and heated to reach 92° C. Sulfuric acid (concentration: 7.7 wt %) was metered into the reactor until the pH of the medium reached a value of 3.9.

A sodium silicate solution (SiO₂/Na₂O ratio=3.44; SiO₂ concentration=19.62 wt %) is introduced over a period of 19 min at a flow rate of 103 g/min simultaneously with sulfuric acid (concentration: 7.7% wt). The flow rate of sulfuric acid was regulated so that the pH of the reaction medium was maintained at a value of 3.9. The temperature was then raised to 94° C.

The introduction of acid was stopped while the addition of the silicate was maintained at a flow rate of 72 g/min until the pH of the reaction medium reached a value of 8.0.

Simultaneously over a period of 16 min were metered sodium silicate at a flow rate of 154 g/min and sulfuric acid (concentration: 7.7 wt %). The sulfuric acid flow rate was regulated so that the pH of the reaction medium was maintained at a value of 8.0. At the end of the simultaneous addition, the pH of the reaction medium was brought to 4.8 with sulfuric acid (concentration: 7.7 wt %). The reaction mixture was allowed to stand for 5 minutes. The silica suspension thus obtained was filtered and washed on a filter press.

The silica cake thus obtained was subjected to a mechanical liquefaction step while water is added to reach a solid content at 17.7%. The pH of the resulting silica suspension was brought to 3.0 by the addition of sulfuric acid (concentration: 7.7 wt %). The resulting suspension was dried by means of a nozzle spray dryer to obtain precipitated silica S5. The properties of silica S5 are reported below.

| | $S_{CTAB}$ (m$^2$/g) | $S_{BET}$ (m$^2$/g) | Ld | d50 (nm) | pH | CPS $V_{(d5-d50)}/V_{(d5-d100)}$ | C (ppm) | $\alpha$ ($\mu m^{-1} min^{-1}$) |
|---|---|---|---|---|---|---|---|---|
| S5 | 250 | 284 | 1.4 | 84 | 4.2 | 0.71 | 0 | $1.8 \times 10^{-2}$ |

Example 7

Rubber compositions suitable for the preparation of passenger car treads were prepared according to the recipe given in Table I (components are expressed in part by weight per 100 parts of elastomers (phr)).

TABLE I

| | I-1 | C-1 |
|---|---|---|
| SBR (1) | 80 | 80 |
| BR (2) | 20 | 20 |
| Silica S1 | 65 | |
| Silica CS1 | | 65 |
| Coupling agent (3) | 9.1 | 9.1 |
| Plasticizer TDAE (4) | 40 | 40 |
| Carbon black N330 | 3.0 | 3.0 |
| ZnO | 1.2 | 1.2 |
| Stearic acid | 2.0 | 2.0 |
| Antioxidant (5) | 2.5 | 2.5 |
| Sulfur | 1.0 | 1.0 |
| CBS (6) | 1.8 | 1.8 |
| DPG (7) | 2.0 | 2.0 |

(1) S-SBR with 60% vinyl-1.2; 27% bound styrene; Tg = −27° C. (« HPR 850» from JSR)
(2) BR (« Buna CB 25 » from Arlanxeo)
(3) TESPT (« Luvomaxx TESPT » from Lehman & voss )
(4) TDAE (Treated distillate aromatic extract) (« Vivatec 500 » from Hansen & Rosenthal KG)
(5) N-1,3-dimethylbutyl-N-phenyl-para-phenylenediamine (« Santoflex 6-PPD » from Flexsys)
(6) N-Cyclohexyl-2-benzothiazyl-sulfenamide (« Rhenogran CBS-80 » from RheinChemie)
(7) Diphenylguanidine (« Rheonogran DPG-80 » from RheinChemie)

Preparation of rubber compositions: the process for preparing the rubber compositions was conducted in three successive phases. First and second mixing stages consisted in a thermomechanical work at high temperature, followed by a third mechanical work stage at temperatures below 110° C. The latter allows the introduction of the vulcanization system.

The first and second phases were carried out by means of a Brabender internal mixer (net chamber volume: 380 mL) with fill factors of 0.62 and 0.59, respectively. The initial temperature and the speed of the rotors were fixed each time so as to reach mixing drop temperatures of about 140-170° C.

During the first step, elastomers, fillers, plasticizer and stearic acid were mixed together; mixing time was between 2 and 10 minutes.

After cooling of the mixture (temperature below 100° C.), zinc oxide and antioxidant were incorporated to the compound during second mixing phase. The duration of this phase was between 2 and 6 minutes.

After cooling of the mixture (temperature below 100° C.), the third mixing phase allowed the introduction of the vulcanization system (sulfur and accelerators). It was carried out in an open two roll mill, preheated to 50° C. The duration of this phase was between 2 and 6 minutes.

The final rubber composition was then formed in sheets having 2-3 mm thickness.

An evaluation of rheological properties of the uncured compounds was run to monitor processability indicators. Once the vulcanization characteristics were determined, uncured compounds were vulcanized at the vulcanization optimum (T98) and mechanical and dynamic properties were measured.

Viscosity of uncured compositions: Mooney viscosity was measured at 100° C. using a MV 2000 rheometer according to NF ISO289 standard. After one minute preheating, the value of the torque was read at 4 minutes (ML (1+4)–100° C.). A strain sweep measurement from 0.3 to 50% was carried out using a D-MDR 3000 rheometer according to DIN 53529 standard, at a temperature of 100° C. and a frequency of 1 Hz. The results are shown in Table II.

TABLE II

| | I-1 | C-1 |
|---|---|---|
| ML (1 + 4)-100° C. (M.U) | 75 | 80 |
| G' 0.3%-100° C. (kPa) | 385 | 463 |
| ΔG' (0.3-50%)-100° C. (kPa) | 215 | 277 |

The uncured composition I-1 comprising inventive silica S1 shows a substantial reduction in Mooney viscosity ML (1+4), in storage modulus G' 0.3% and in Payne effect ΔG' (0.3-50%) with respect to control composition C-1. Processability of the uncured rubber mixture containing the silica of the present invention is substantially improved compared to the one containing silica CS1.

Vulcanization of uncured compositions: measurements were carried out over 30 minutes at 160° C. at 3° amplitude oscillation using an ODR MONSANTO rheometer according to the NF ISO 3417 standard. The rheometric torque was measured as a function of time. This allows to infer the vulcanization reaction of the compositions and to monitor the following parameters: minimum torque (minT), which reflects the torque of uncured compound at the tested temperature; maximum torque (maxT) which reflects the torque of cured compound; delta torque (ΔT=maxT−minT) which reflects the degree of rubber crosslinking; curing time T98 gives the time to obtain a vulcanization rate corresponding to 98% of the complete vulcanization (T98 is taken as optimum vulcanization); scorch time TS2 corresponds to the time required to increase torque by 2 points above the minimum torque at the temperature considered (160° C.) and it reflects the time during which it is possible to process the uncured composition prior to initiation of vulcanization reaction. The results obtained are shown in Table III.

Mechanical properties of cured compositions: Shore A hardness measurement of the cured compositions was carried out according to ASTM D 2240 standard. The values were taken after 3 seconds.

Uniaxial tensile tests were carried out in accordance with NF ISO 37 standard with H2 specimens at a speed of 500 mm/min on an INSTRON 5564. Moduli M100 and M300 (respectively obtained at strains of 100% and 300%) and tensile strength are expressed in MPa; elongation at break is expressed in %. A reinforcement index, defined as the ratio between modulus obtained at 300% strain and the one obtained at 100% strain, is also provided. The measured properties are summarized in Table III.

Dynamic properties of cured compositions: they were measured on a viscoanalyzer (Metravib DMA+1000) according to ASTM D5992.

The values of loss factor (tan δ) and of complex modulus (E*) were recorded in dynamic compression on vulcanized samples (cylindrical specimen of section 95 mm² and height 14 mm). The sample was subjected initially to a pre-strain of 10% then to sinusoidal dynamic strain amplitude of ±2%. The measurements were carried out at 60° C. and at a frequency of 10 Hz.

The results, presented in Table III, are the complex modulus (E*—60° C.—10 Hz) and loss factor (tan δ—60° C.—10 Hz).

TABLE III

|  | I-1 | C-1 |
| --- | --- | --- |
| minT (dN · m) | 17.2 | 18.6 |
| maxT (dN · m) | 58.4 | 57.7 |
| ΔT (dN · m) | 41.2 | 39.1 |
| TS2 (min) | 4.7 | 4.3 |
| T98 (min) | 27.6 | 26.8 |
| Shore A-3s (pts) | 54 | 56 |
| Modulus M100 (Mpa) | 1.8 | 2.1 |
| Modulus M300 (Mpa) | 8.9 | 8.9 |
| Tensile strength (Mpa) | 16.4 | 14.8 |
| Elongation at break (%) | 440 | 418 |
| M300/M100 | 4.9 | 4.2 |
| E*10 +/− 2% (MPa) | 4.9 | 5.5 |
| tan δ 10 +/− 2% | 0.104 | 0.109 |

Composition I-1 comprising inventive silica S1 shows an increase in scorch time with respect to composition C-1 with comparable vulcanization time T98. The increase in scorch time is advantageous as it provides increased thermal stability during the extrusion process without increasing substantially the length of the vulcanization process step. Composition I-1 additionally shows an increase in reinforcement index and in tensile strength, thus leading to an improvement in the wear properties of the elastomeric composition.

Overall composition I-1, having a high plasticizer loading, shows an improvement in the compromise between processability and wear performances compared to composition C-1 containing silica CS1.

Example 8

Rubber compositions suitable for passenger car treads were prepared according to the recipe given in Table IV (components are expressed in part by weight per 100 parts of elastomers (phr)).

TABLE IV

|  | I-2 | C-2 |
| --- | --- | --- |
| SBR (1) | 90 | 90 |
| BR (2) | 10 | 10 |
| Silica S1 | 60 |  |
| Silica CS1 |  | 60 |

TABLE IV-continued

|  | I-2 | C-2 |
| --- | --- | --- |
| Coupling agent (3) | 7.5 | 7.5 |
| Plasticizer MES (4) | 20 | 20 |
| Carbon black N234 | 3.0 | 3.0 |
| ZnO | 2.5 | 2.5 |
| Stearic acid | 2.0 | 2.0 |
| Antioxidant (5) | 2.5 | 2.5 |
| Sulfur | 1.3 | 1.3 |
| CBS (6) | 2.1 | 2.1 |
| DPG (7) | 2.0 | 2.0 |

(1) S-SBR with 63% vinyl-1.2; 21% bound styrene; Tg = −25° C. (« Sprintan SLR 4602 » from Trinseo)
(2) BR (« Buna CB 25 » from Arlanxeo)
(4) TESPD (« Luvomaxx TESPT » from Lehman & voss )
(5) MES (Mild extracted solvate) (« Vivatec 200 » from Hansen & Rosenthal KG)
(7) N-1,3-dimethylbutyl-N-phenyl-para-phenylenediamine (« Santoflex 6-PPD » from Flexsys)
(6) N-Cyclohexyl-2-benzothiazyl-sulfenamide (« Rhenogran CBS-80 » from RheinChemie)
(7) Diphenylguanidine (« Rheonogran DPG-80 » from RheinChemie)

Preparation of rubber compositions: the process for preparing the rubber compositions was conducted in two successive phases. First mixing stage consisted in a thermomechanical work at high temperature, followed by a second mechanical work stage at temperatures below 110° C. The latter allows the introduction of the vulcanization system.

The first phase was carried out by means of a Brabender internal mixer (net chamber volume: 380 mL) with fill factor of 0.62. The initial temperature and the speed of the rotors were fixed so as to reach mixing drop temperatures of about 140-170° C.

After cooling of the mixture (temperature below 100° C.), the second mixing phase allowed the introduction of the vulcanization system (sulfur and accelerators). It was carried out in an open two roll mill, preheated to 50° C. The duration of this phase was between 2 and 6 minutes.

The final rubber composition was then formed in sheets having 2-3 mm thickness.

An evaluation of rheological properties on uncured compounds was run to monitor processability indicators. Once the vulcanization characteristics were determined, uncured compounds were vulcanized at the vulcanization optimum (T98) and mechanical and dynamic properties were measured.

Viscosity of Uncured Compositions

Mooney viscosity was measured under the same conditions of Example 6. A strain sweep measurement from 0.9 to 50% was carried out using a D-MDR 3000 rheometer according to DIN 53529 standard, at a temperature of 100° C. and a frequency of 1 Hz. The results are shown in Table V.

TABLE V

|  | I-2 | C-2 |
| --- | --- | --- |
| ML (1 + 4)-100° C. (M.U) | 107 | 116 |
| G' 0.9%-100° C. (kPa) | 485 | 566 |
| ΔG' (0.9-50%)-100° C. (kPa) | 591 | 757 |

The uncured composition I-2 comprising inventive silica S1 shows a substantial reduction in Mooney viscosity ML (1+4), in storage modulus G' 0.9% and in Payne effect ΔG' (0.9-50%) with respect to control composition C-2. Processability of uncured rubber mixtures containing the silica of the present invention is substantially improved compared to silica CS1 having higher pH.

Vulcanization of the uncured compositions and the mechanical properties of the cured compositions were evaluated under the same conditions of Example 6. The results are collected in Table VI.

TABLE VI

|  | I-2 | C-2 |
|---|---|---|
| minT (dN · m) | 18.0 | 20.5 |
| maxT (dN · m) | 74.0 | 77.6 |
| ΔT (dN · m) | 56.0 | 57.1 |
| TS2 (min) | 3.9 | 3.4 |
| T98 (min) | 13.7 | 13.4 |
| Shore A-3s (pts) | 65 | 67 |
| Modulus M100 (Mpa) | 2.5 | 2.6 |
| Modulus M300 (Mpa) | 10.2 | 9.4 |
| Tensile strength (Mpa) | 20.6 | 20.4 |
| Elongation at break (%) | 472 | 490 |
| M300/M100 | 4.1 | 3.6 |

Composition I-2 comprising inventive silica S1 exhibits an increase in scorch time with respect to control composition C-2, without slowing the vulcanization speed. It also has an increased reinforcement index at a comparable tensile strength, thus leading to an improvement in the wear properties of the elastomeric composition.

Dynamic properties of cured compositions: were measured on a viscoanalyzer (Metravib DMA+1000) according to ASTM D5992.

Dynamic Response of Cured Compositions Under Strain Sweep Conditions

Specimens (section 8 mm$^2$, height 7 mm) were subjected to a sinusoidal deformation in alternating double shear at a temperature of 40° C. and at a frequency of 10 Hz according to a cycle round trip, ranging from 0.1% to 50% for the forward cycle and from 50% to 0.1% for the return cycle.

The values of the maximum loss factor (tan $\delta_{max}$), the shear storage modulus ($G'_{0.1\%}$, $G'_{50\%}$) and the Payne effect ($G'_{0.1\%}$-$G'_{50\%}$) were recorded during the return cycle. The results are shown in Table VII.

TABLE VII

|  | I-2 | C-2 |
|---|---|---|
| $G'_{0.1\%}$ (MPa) | 3.5 | 4.6 |
| $G'_{0.1\%}$-$G'_{50\%}$ (MPa) | 2.3 | 3.1 |
| tan $\delta_{max}$ | 0.204 | 0.214 |

Composition I-2 presents both a reduced Payne effect and a reduced maximum loss factor tan δ max. Both effects lead to an improved energy dissipation ability of the composition, hence a reduction in rolling resistance of the final tire.

Dynamic Response of Cured Compositions Under Temperature Sweep Conditions

Specimens (section 8 mm$^2$, height 7 mm) were tested at a temperature sweep from −45° C. to +45° C. (temperature rise rate of +5° C./min), under an alternating double shear sinusoidal deformation of 1% and at a frequency of 10 Hz. The maximum loss factor (tan δ max) was measured. The results are summarized in Table VIII.

TABLE VIII

|  | I-2 | C-2 |
|---|---|---|
| tan δ max | 0.976 | 0.892 |
| T max (° C.) | −19.8 | −19.3 |

Composition I-2, containing silica S1, shows an increase of the maximum loss factor (tan δ max) which can be correlated to an improvement of the wet grip properties of a tire.

Overall, the use of the inventive silica in the preparation of a rubber composition using a short mixing time (2 mixing phases in total) provides an improvement in the compromise among processability, energy dissipation, wet grip and wear performances in comparison with a composition containing a silica having a higher pH.

The invention claimed is:

1. A process for preparing a precipitated silica, comprising the steps of:
   (i) providing a starting solution having a pH from 2.0 to 5.0,
   (ii) simultaneously adding a silicate and an acid to said starting solution such that the pH of the reaction medium is maintained in the range from 2.0 to 5.0,
   (iii) stopping the addition of the acid and of the silicate and adding a base to the reaction medium to raise the pH of said reaction medium to a value from 7.0 to 10.0,
   (iv) simultaneously adding to the reaction medium a silicate and an acid, such that the pH of the reaction medium is maintained in the range from 7.0 to 10.0,
   (v) stopping the addition of the silicate while continuing the addition of the acid to the reaction medium to reach a pH of the reaction medium of less than 5.5 and obtaining a first suspension of precipitated silica,
   (vi) submitting said first suspension of precipitated silica to filtration to provide a filter cake;
   (vii) submitting said filter cake to a liquefaction step in the presence of a mineral acid such that the pH of the resulting precipitated silica is less than 5.5, to obtain a second suspension of precipitated silica; and
   (viii) optionally, drying the precipitated silica obtained after the liquefaction step, wherein the so prepared precipitated silica has
   a CTAB surface area $S_{CTAB}$ greater than 140 m$^2$/g;
   a width of the aggregate size distribution Ld, measured by centrifugal sedimentation, of at least 1.2;
   a pH of less than 5.5; and
   a carbon content of less than 1500 ppm.

2. The process according to claim 1, wherein in step (iii), the addition of the acid is stopped while the addition of the silicate to the reaction medium is continued to raise the pH of said reaction medium to a value from 7.0 to 10.0.

3. The process according to claim 1, wherein the carbon content of the so prepared precipitated silica does not exceed 1000 ppm.

4. The process according to claim 1, wherein the carbon content of the so prepared precipitated silica is less than 100 ppm.

5. The process according to claim 1, wherein the carbon content of the so prepared precipitated silica is less than 10 ppm.

6. The process according to claim 1, wherein the CTAB surface area $S_{CTAB}$ of the so prepared precipitated silica is greater than 160 m$^2$/g.

7. The process according to claim 1, wherein the CTAB surface area $S_{CTAB}$ of the so prepared precipitated silica is from 190 to 350 m$^2$/g.

8. The process according to claim 1, wherein the CTAB surface area $S_{CTAB}$ of the so prepared precipitated silica is from 220 to 350 m$^2$/g.

9. The process according to claim 1, wherein the so prepared precipitated silica has a disagglomeration rate α equal to or greater than 0.5×10$^{-2}$ μm$^{-1}$min$^{-1}$.

10. The process according to claim 1, wherein the pH of the so prepared precipitated silica is less than 5.0.

11. The process according to claim 1, wherein the pH of the so prepared precipitated silica is less than 4.5.

12. The process according to claim 1, wherein the pH of the so prepared precipitated silica is not less than 2.5.

13. The process according to claim 1, wherein the pH of the so prepared precipitated silica is equal to or greater than 3.0.

14. The process according to claim 1, wherein the pH of the so prepared precipitated silica is of at least 2.5 and less than 5.0.

15. The process according to claim 1, wherein the pH of the so prepared precipitated silica is of at least 3.0 and less than 4.5.

16. The process according to claim 1, wherein the BET surface area $S_{BET}$ of the so prepared precipitated silica is greater than 165 m²/g.

17. The process according to claim 1, wherein the so prepared precipitated silica has:
- a CTAB surface area $S_{CTAB}$ from 180 to 350 m²/g;
- a width of the aggregate size distribution Ld, measured by centrifugal sedimentation, in the range from 1.2 to 3.0;
- a pH in the range from 3.5 to 5.5;
- a carbon content not exceeding 1000 ppm; and
- a disagglomeration rate a equal to or greater than $0.5 \times 10^{-2} \mu m^{-1} min^{-1}$.

18. The process according to claim 1, wherein the aluminum content of the so-prepared precipitated silica is less than 700 ppm.

19. The process according to claim 1, wherein the so-prepared precipitated silica has a ratio $V_{(d5-d50)}/V_{(d5-d100)}$ equal to or greater than 0.60.

* * * * *